April 2, 1946.  W. H. BEANE  2,397,720
APPARATUS FOR STACKING LUMBER
Filed Feb. 8, 1943  4 Sheets-Sheet 1
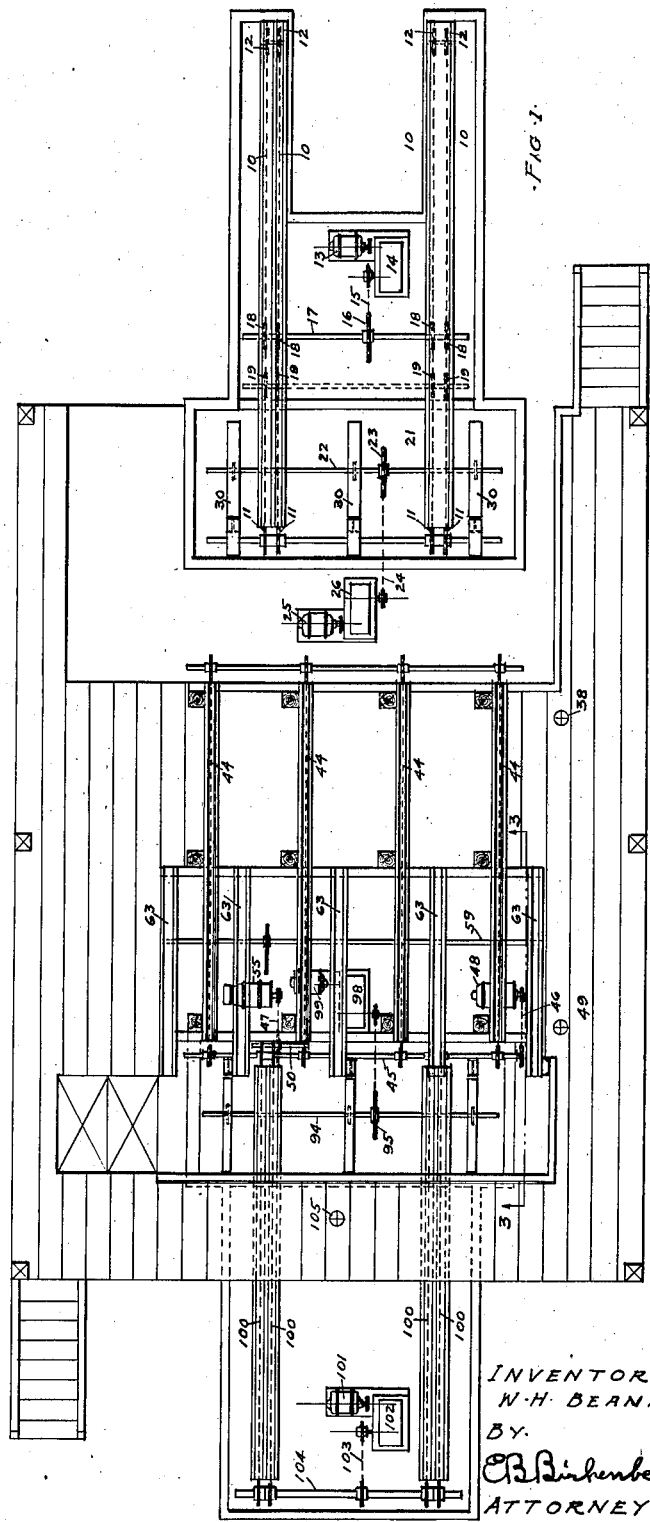
INVENTOR
W. H. BEANE.
BY
ATTORNEY April 2, 1946. W. H. BEANE 2,397,720
APPARATUS FOR STACKING LUMBER
Filed Feb. 8, 1943 4 Sheets-Sheet 2
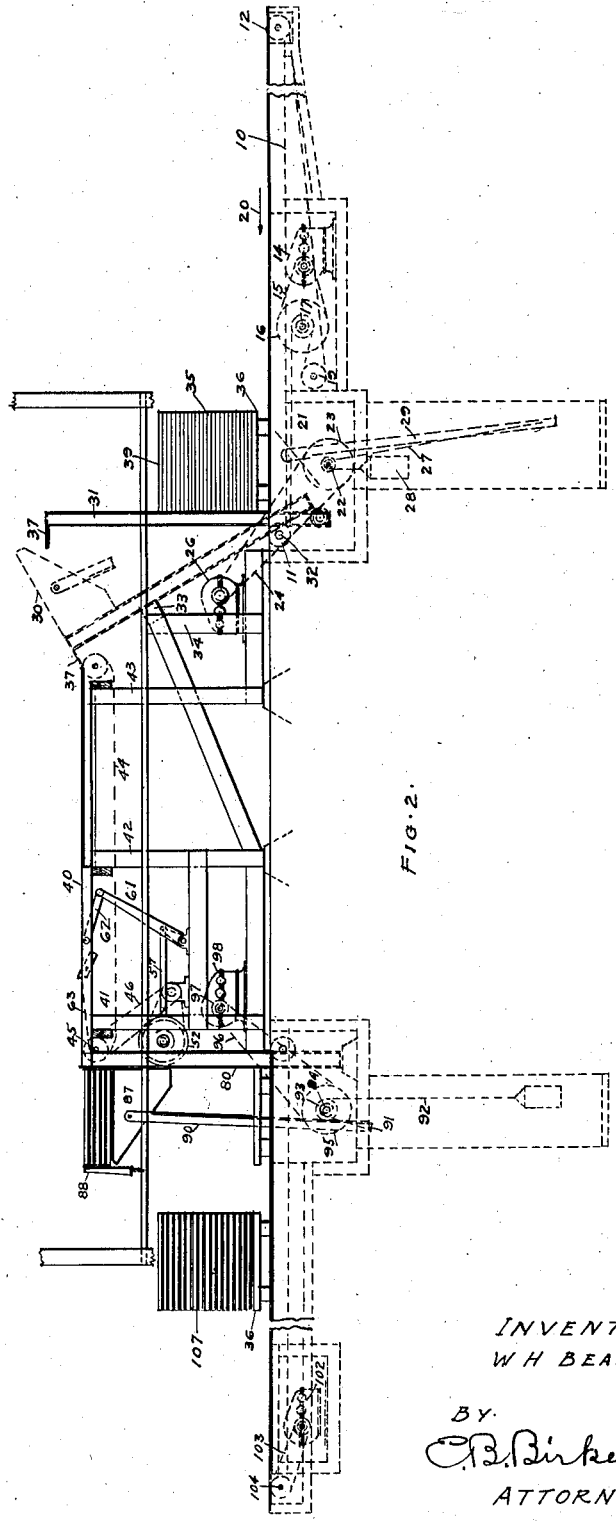
INVENTOR
W H BEANE
BY
C. B. Birkenbeul
ATTORNEY April 2, 1946.  W. H. BEANE  2,397,720
APPARATUS FOR STACKING LUMBER
Filed Feb. 8, 1943  4 Sheets-Sheet 3
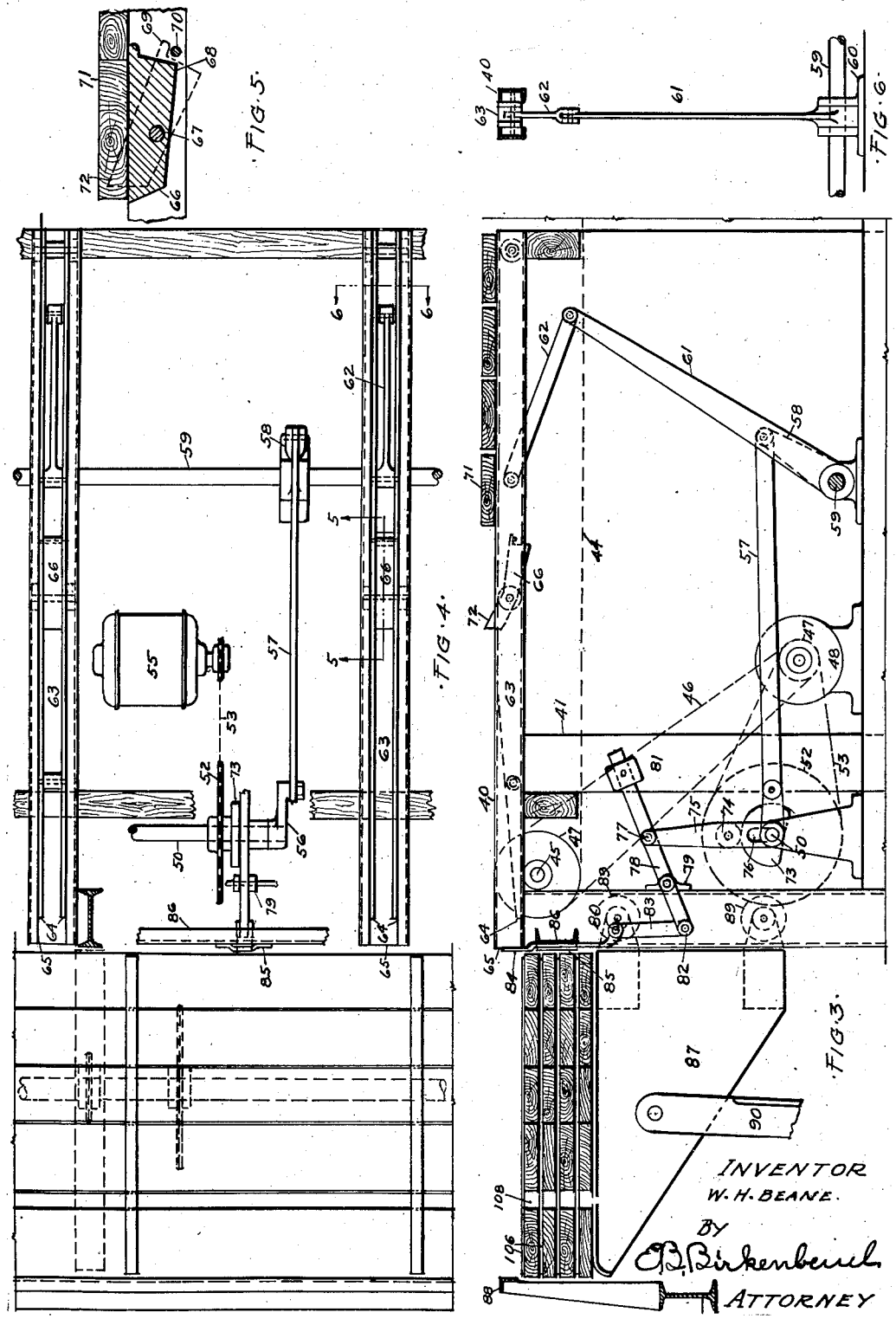
INVENTOR
W. H. BEANE.
BY
E. B. Birkenbeuel
ATTORNEY April 2, 1946.  W. H. BEANE  2,397,720
APPARATUS FOR STACKING LUMBER
Filed Feb. 8, 1943  4 Sheets-Sheet 4
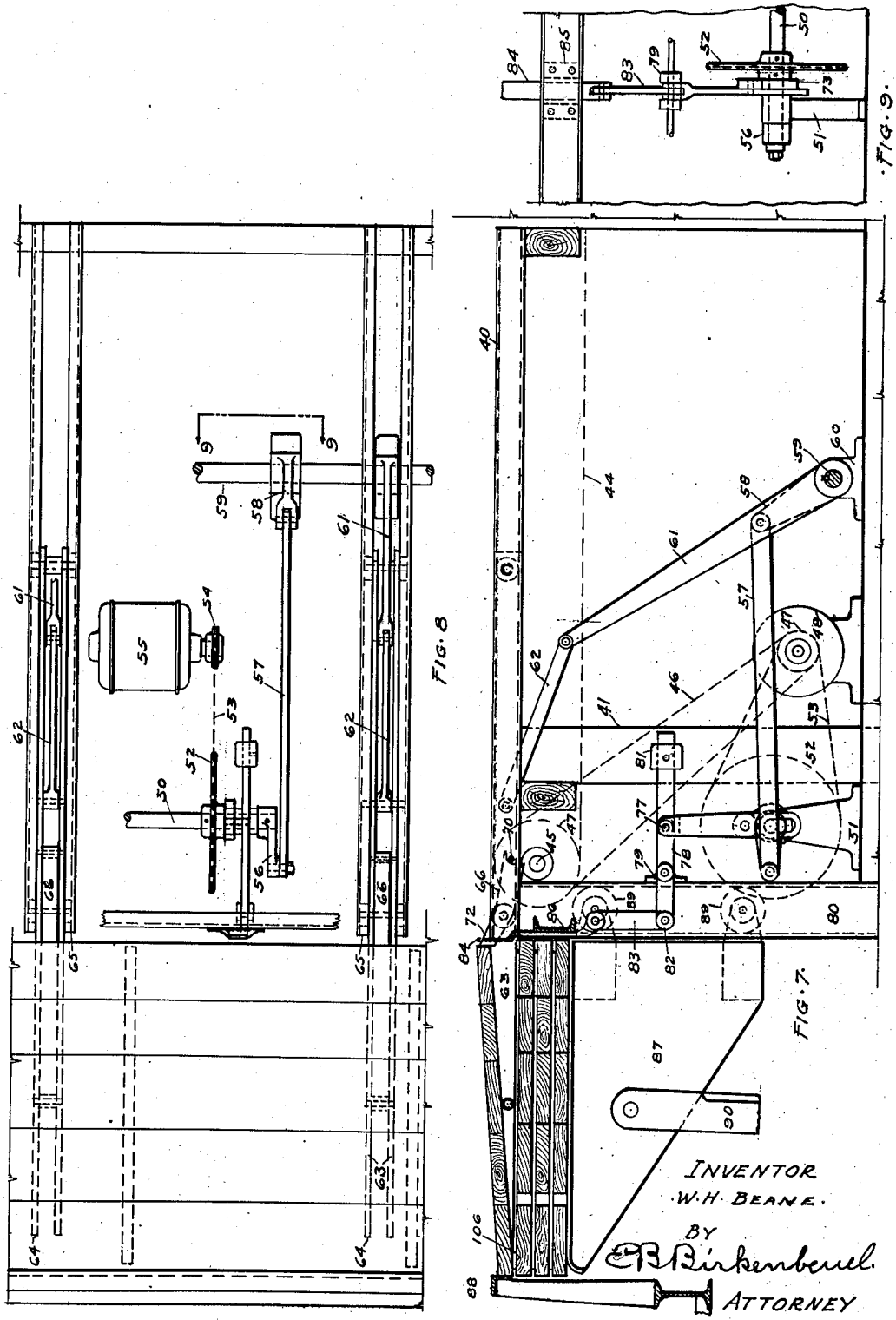

Patented Apr. 2, 1946

2,397,720

UNITED STATES PATENT OFFICE 2,397,720

APPARATUS FOR STACKING LUMBER

Walter H. Beane, Klamath Falls, Oreg.

Application February 8, 1943, Serial No. 475,167

2 Claims. (Cl. 214—6)

This invention relates generally to wood sawing mills and particularly to a method of and apparatus for stacking lumber.

The main object of this invention is to construct a stacker and employ a method of restacking clean lumber as it comes from the saws into straight-sided piles, the layers of which are spaced by sticks for ventilating purposes and in which one or more spaces may be left between the boards of each layer for the purpose of keeping the sides of the pile even and permitting air to circulate upwardly through the layers of a given stack.

The second object is to expedite the manufacture of lumber by reducing the amount of time and labor required in the preparation of lumber for placement in the drying kiln.

These and other objects are accomplished in the manner set forth in the following specification as illustrated in the accompanying drawings, in which:

Fig. 1 is a plan of the entire apparatus.

Fig. 2 is a side elevation of the apparatus.

Fig. 3 is an enlarged, fragmentary section taken along the line 3—3 in Fig. 1 showing the parts in position preceeding the depositing of a layer of lumber on a set of sticks.

Fig. 4 is a fragmentary plan of Fig. 3 with parts broken away.

Fig. 5 is an enlarged section taken along the line 5—5 in Fig. 4.

Fig. 6 is a fragmentary section taken along the line 6—6 in Fig. 4.

Fig. 7 is a view similar to Fig. 3 but showing the parts in position to place a layer of lumber upon the sticks.

Fig. 8 is a plan of Fig. 7.

Fig. 9 is a fragmentary elevation taken along the line 9—9 in Fig. 8.

Similar numerals refer to similar parts throughout the several views.

Break-down unit

Referring in detail to the drawings, there is shown a set of pull-up chains 10 which pass around the sprocket wheels 11 and 12 and are driven by the motor 13 through a reduction gear contained within the casing 14 which through a chain 15, drives a sprocket wheel 16 on the transverse shaft 17 whose sprocket wheels 18 drive the chains 10.

Chain tightening sprocket wheels 19 also engage the chains 10 and hold them in suitable contact with the driving sprocket wheels 18. The top run of the chain 10 travels in the direction indicated by the arrow 20 which discharges over a pit 21, within which is mounted a mechanical break-down mechanism which is specifically described in Patent No. 2,373,646.

Briefly, it consists of a transverse, horizontal shaft 22 which is provided with a sprocket wheel 23 around which passes a chain 24 which is driven from a motor 25 through the reduction gear contained in the housing 26. The shaft 22 has wound around same cables 27 to each of which is attached a weight 28. The unweighted end of each cable 28 is attached to the lower end of a pusher arm 29. The upper ends of the pusher arm 29 are attached to knees 30. The knees 30 are laterally spaced and guided on the tiltable upright standards 31 which are normally in the vertical position shown in full lines in Fig. 2. The standards 31 are tiltable about the pivots 32 and may assume the position shown in dotted lines, at which time they rest against the transverse stop 33 which is mounted on the uprights 34.

It will be noted that the pusher arm 29 is connected to the knee 30 somewhat outside of the center of the stack of green lumber 35 which is placed on the carrier 36. It is desirable to provide a lip 37 on the upper ends of the standards 31 to expedite the movement of the boards from the knees 30.

A break-down operator is located at the station 38 and his duties are to control the operation of the motors 13 and 25 as follows:

In order to move a stack of green lumber to the break-down unit, he operates motor 13 by means of controls (not shown) until the stack reaches a position shown in Fig. 2—that is, against the standards 31. The operator at station 38 then starts the motor 25 which causes the shaft 22 to rotate and through the cable 27 and pusher arm 29 to raise the knee 30 until the uppermost layer of boards 39 clears the lip 37.

It will be noted that the arm 29 is attached to the knee 30 somewhat outside of the center of the stack 35 causing the stack 35 and the standards 31 to tilt to the position shown in dotted lines in Fig. 2.

Transfer unit

The transfer unit consists of an elevated table 40 which is mounted on the standards 41, 42 and 43 which in turn support the transfer conveyor chains 44 which are driven from the transverse shaft 45 through the sprocket chain 46 and sprocket wheels 47 from the motor 48 under the control of the operator at the station 49.

Under the shaft 45 is a crankshaft 50 which journals in the standards 51. The shaft 50 has secured thereon a sprocket wheel 52 which is connected by means of a chain 53 to the sprocket 54 of the motor 55.

Secured on the shaft 50 is a crank arm 56 which is joined by the connecting rod 57 to the lever 58 which is secured to the shaft 59 which in turn journals in the bearing 60. Also secured in the shaft 59 are the transfer levers 61 whose upper ends are joined by the connecting links 62 to the five tapered bars 63 which are slidably mounted in parallelism across the width of the transfer section. The throw of the crank 56 is such that when the crank is in the position shown in Fig. 3, the point 64 of each bar 63 is withdrawn beyond the ends 65 of the table 40.

Each bar 63 has pivotally mounted thereon a dog 66 which is rockable on the pin 67 and its ends 68 for limiting in its downward movement the projector 69 which engages the stop pin 70. The dogs 66 are so arranged that the boards 71 may pass over the end 72 under the action of the chains 44 causing the dogs 66 to assume the position shown in Fig. 5.

On the shaft 50 is secured the cam 73 which engages a roller 74 secured to the side of the slotted link 75 whose slot 76 receives the shaft 50 and whose upper end is connected by means of a pin 77 to the weighted lever 78 which is pivoted on the journal 79 secured to the standard 80.

A weight 81 is adjustably mounted on the lever 78. The end 82 of the lever 78 is connected by the link 83 to the vertically slidable stops 84 which are either in a lowered position as shown in Fig. 3 or in an elevated position as shown in Fig. 7, their purpose being to prevent the lumber from returning to the transfer chains as the bars 63 recede. The stops 84 guide in the straps 85 which are secured to the transfer channel bar 86.

Slidably mounted along side of the standard 80 are the unstacker knees 87 which move only in a vertical plane. A stop 88 is provided for the purpose of straightening one side of the stack.

The knees 87 ride on the rollers 89 which are confined by the sides of the channel shaped members 80. Each knee 87 is supported by a pusher arm 90 whose lower end 91 is attached to a cable 92 which passes over a drum 93 on the transfer shaft 94 which is secured to a sprocket wheel 95 whose chain 96 is operated from the sprocket pinion 97 on the motor driven reduction gearing 98 whose motor 99 is under the control of the operator at station 49.

Outgoing chains 100 are disposed beneath the knees 87 and convey the carrier platforms 36 to the kilns or to air drying locations. The chains 100 are operated by the motor 101 through the reduction gearing 102 through the chain 103 which drives the transverse shaft 104 which in turn drives the chains 100.

An operator known as the sticker man is located at station 105 and it is his duty to place upon each layer of boards the stickers 106 which serve to provide ventilation between the boards and tie the boards of the stack together.

The operation of this portion of the device is as follows:

As the operator at station 38 permits a layer of boards 39 to slide from the knees 30 by raising the stack 35 to the point where they will clear the lip 37, the entire layer of boards 39 slides downwardly upon the transfer conveyor chains 44. The chains 44 now move the layer or tier of boards 39 horizontally until they reach the end 72 of the dogs 66 causing them to disappear as shown in Fig. 5.

When the last board of a tier 39 passes the end 72, the end automatically rises to the position shown in Fig. 3 due to its unbalanced condition.

The operator at station 49 now causes the motor 55 to operate. The parts are now in the position shown in Fig. 3 in which the cam 73 has raised the roller 74 leaving the stops 84 in their lowermost position. The rotation of the shaft 50 and crank 56 causes the levers 61 to move to the position shown in Fig. 7 in which the tapered arms 63 carry the tier of boards against the stop 88 under the action of the dogs 66.

It will be noted that while these boards are being pushed toward the stop 88 they are all in contact with each other and the total of the upper layer is somewhat less than the width of the restacked package 107.

As the motor 55 continues to revolve, the roller 74 drops off of the cam 73 causing the stops 84 to rise and prevent the backward movement of the boards as the tapered members 63 are withdrawn—that is, all of the boards except the first are moved backwardly until they are stopped by the members 84; leaving a crack or space 108 between the two outermost boards for ventilation purposes and also to leave the outermost sides of the package perfectly straight.

It can be seen from the foregoing that by this relatively simple apparatus, it is possible to take a package of somewhat unevenly piled green lumber from the saws and quickly and accurately repile same placing stickers between the various layers of boards and causing the outermost edges of the package to be in alinement—that is, in a vertical plane—leaving voids within the package for ventilating purposes.

The operation of the device is as follows:

Bearing in mind that the object is to take stacks of roughly piled lumber as it comes from the saws and in which condition various numbers of boards may form the different tiers and the boards in each tier may be spaced and not in parallelism. It will be assumed that such a stack of boards 35 has been moved in a position by the pull-up chains 10, as shown in Fig. 2. The stack 35 is then elevated by the pusher arm 29 which also serves to incline the stack elevator as shown in dotted lines. As each tier of boards from the stack 39 rises above the conveyor table 40, the tier slides downwardly onto the chains 44, and the boards in the tier are carried along until the first one engages the stops 84, after which the following boards are all moved up into close contact with the preceding boards, and the chain 44 merely slips underneath the boards in the tier.

Now assuming that the pusher arm 90 has been lowered to the position shown in Fig. 3 and sticks 106 have been placed across the stack thus far formed, then any lowering of the stops 84 and simultaneous moving of the levers 61 will cause the dog end 72 to move as many of the boards 71 as are required to make one full tier. Now the dog ends 72 move faster than do the chains 44 and they have time to deliver the tier of boards to the newly formed stack on the knees 87 and return again to the position shown in Fig. 3. Obviously the chains 44 can continue to advance boards over the dog end 72 by merely depressing same.

The function of the tapered end 63 is shown best in Fig. 7 wherein it will be noted that the points of the members 63 do not reach the endmost board which contacts the stop 88. In other words, the first board is permitted to rest upon the sticks, or stickers as they are called, so that the return movement of the member 63 will carry all of the boards but the one which is touching the stop 88 until the rearmost board contacts the stops 84, after which a further withdrawal of the members 63 would permit the boards to drop, one after the other onto the supporting sticks, leaving the newly formed stack perfectly even along the edges and perfectly bounded and separated for ventilation by the ties, at the same time insuring at least one void in each tier for the vertical passage of air therethrough, and to permit a reasonable variation in the lumber width, which of course normally exists.

I claim:

1. An apparatus of the class described having in combination a transfer table having transfer chains mounted thereon adapted to carry a layer of boards the length of the table, tapering arms shorter than the width of said layer slidably mounted under said transfer chains forming an extension therefor, said tapering arms having dogs thereon for engaging the rearmost edge of the layer and pushing it outwardly to a predetermined line representing one edge of a package to be formed and then withdrawing all of the boards but one so that the outermost edge thereof coincides with the second side of the stack to be formed in a manner to produce lateral voids in the stack.

2. A device of the class described consisting of a horizontal chain conveyor adapted to carry a layer of boards in combination with a pair of reciprocating arms disposed in parallelism with said conveyor, the top side of said arms sloping downwardly toward the discharging end thereof the length of said arms being less than the width of said layer, dogs pivotally mounted on said arms adapted to engage boards placed on said conveyor when moved forwardly and to slide along the underside of said boards when moved backwardly, a movable stop in front of said chain conveyor behind which a plurality of boards can be gathered, a second stop disposed from said first mentioned stop at a distance approximating the width of a stack to be formed, a stacker disposed between said stops including means for lowering same as tiers of boards are disposed thereon.

WALTER H. BEANE.